(12) United States Patent
Bain et al.

(10) Patent No.: US 6,766,571 B1
(45) Date of Patent: Jul. 27, 2004

(54) ADHESIVE COMPOSITION COMPRISING THERMOPLASTIC POLYESTER AND TRAPPED GAS BUBBLES

(76) Inventors: Peter Stewart Bain, 103 Rein Rd., Wakefield, WF3 1JQ (GB); Giovanni Manfre, Via Vincenza, 11, I-Verona (IT)

( * ) Notice: Subject to any disclaimer, the term of this patent is extended or adjusted under 35 U.S.C. 154(b) by 204 days.

(21) Appl. No.: 10/049,318

(22) PCT Filed: Aug. 10, 2000

(86) PCT No.: PCT/GB00/03028
§ 371 (c)(1),
(2), (4) Date: Jun. 17, 2002

(87) PCT Pub. No.: WO01/10661
PCT Pub. Date: Feb. 15, 2001

(30) Foreign Application Priority Data

Aug. 10, 1999 (GB) .............................. 9918751

(51) Int. Cl.$^7$ ........................... B23P 19/00; B23P 25/00
(52) U.S. Cl. .............................. 29/462; 29/423; 29/424; 29/897.32; 521/138; 521/182
(58) Field of Search .......................... 29/462, 423, 424, 29/897.23; 521/138, 182

(56) References Cited

FOREIGN PATENT DOCUMENTS

| GB | 2 135 903 A | 9/1984 | ............... C09J/3/16 |
| WO | WO99/16618 | 4/1999 | ........... B23B/27/08 |

*Primary Examiner*—Morton Foelak
(74) *Attorney, Agent, or Firm*—Myers Bigel Sibley & Sajovec, P.A.

(57) ABSTRACT

A glazing adhesive product comprising a thermoplastic polyester material having trapped gas bubbles dispersed therein whereby the product has surface pores to provide a suction effect. Also provided is a method of installing/removing vehicle glazing.

10 Claims, 1 Drawing Sheet

ADHESIVE COMPOSITION COMPRISING THERMOPLASTIC POLYESTER AND TRAPPED GAS BUBBLES

RELATED APPLICATION

The present application is a U.S. national phase application of PCT International Application No. PCT/GB00/03028, having an international filing date of Aug. 10, 2000 and claiming priority from British Patent Application No. 9918751.0, filed Aug. 10, 1999, the disclosures of which are incorporated herein by reference in their entirety. The above PCT International Application was published in the English language and has International Publication No. WO 01/10661 A1.

FIELD OF THE INVENTION

The present invention relates to an adhesive for use in sealing together two surfaces, for use especially in the glazing industry in general and in securing vehicle windscreens and/or windows. The invention also provides a method of use for installing and/or replacing vehicle windscreens and/or other fixed glazing on vehicles.

BACKGROUND OF THE INVENTION

Typically to install a window pane in a wooden/plastic/metal frame, the glass pane is firstly held in position against nails or other clasps and then fixed into position by putty or plasters material. Conventional putty is a cement made from whiting and linseed oil which hardens over time to provide a peripheral rim of the window pane, thus separating interior and exterior environments and preventing air, moisture and/or heat transfer. The installation is completed once the putty has dried and this usually takes up to 6 hours or so depending on the kind of plasters used.

To remove a window pane after it has been fixed in position in a frame requires the window itself to be shattered so that the hardened putty or plasters can be scraped/chiselled away from the frame. The removal operation can cause damage to the frame and varnishes.

In use, the window pane is held rigidly around its edges so that even relatively small vibrational mechanical movements such as with earthquakes or bomb blasts or strong winds can cause the window pane to shatter.

In the automotive industry, cars direct from the factory production line typically have the windscreens and other fixed windows, including light assemblies fixed into position by placing the glass against a frame rim and using adhesives so as to direct glaze the glass. The life span of a windscreen and other fixed windows are significantly shorter than that of the vehicle itself partially due to degradation or damage or being deliberately broken by vandals/car thieves. Thus a motorist may need to replace the windscreen several times during the vehicle's lifetime.

Additionally, glued glazings have to be replaced any time the window, especially the windscreen, has been damaged in its optical performance by, for example, impact stones or other fractures or abrasion by wipers. Damage to the window surface can increase the scattering of light and may reduce the visibility to levels below safety limits. Moreover, regulations of motor worthiness stipulate that there can be no chips or visual impairments on laminated windscreens, so whereas recent improvements have made the windscreens shatter-proof, they are still prone to chipping and fracturing and thus will require replacement.

The process of replacing vehicle windscreens is both laborious and time consuming. The automotive glass fitter has first to remove the defective windscreen (usually in intact form), however the windscreen is firmly bonded in place and the adhesive sealant is hardened. Typically the fitter uses a device comprising a cheesewire. The cheesewire is used to cut/saw through the hardened rubber along the periphery of the windscreen. This process requires physical force and can lead to musculo-skeletal conditions in the fitters themselves as a result of repetitive strain injury. Further problems associated with this method are that the cheesewires can overheat due to friction, additionally the wires themselves can break and consequently injure the fitter's limbs/hands/eyes.

Other methods of detaching the windscreen from the adhesive sealant include: the use of mechanical oscillator knives/cutters to cut through the hardened material or; directed heat such as a laser beam to soften the sealant prior to removing the windscreen with either cheesewire or specialised bladed tools. The problem with a method where heat is directly applied to the sealant is that the heat required to soften the hardened adhesive sealant can concomitantly and inadvertently damage the vehicle's paintwork and/or other exterior surfaces. For example, a pulsed laser that is set to pulse too fast will not generate enough energy to char the adhesive sealant and a pulsed laser that is set too slow will burn the adhesive sealant and liquify it.

Once the windscreen has been freed from the rubber sealant it can be removed and the surround scraped before it is replaced. It is known from the prior art to use urethane based adhesives to fix/seal the replaced windscreen in place and to apply the adhesive from a dispenser gun to specific peripheral edges so as not to impinge on the viewing capacity of the windscreen. The adhesive typically takes about 8 hours to cure.

Recent advances to the industry have provided for the inclusion of fast cure agents/catalysts so as to speed up the time from vehicle drop-off to vehicle collection. The fast cure agents/catalysts can be provided pre-mixed in the adhesive composition or alternatively can be mixed with the adhesive at the point of exit from a dispensing gun. However the problem still remains that the removal of a defective windscreen and its subsequent replacement is a laborious and time consuming process which can result in damage to the dashboard interior or vehicle paint-work.

A further disadvantage associated with present adhesives such as polyurethanes and/or MS polymers and/or other adhesives is that before applying the adhesive around a window aperture, the aperture surface and glazing must be rigorously cleaned/degreased and primed. This process can be time consuming moreover the fitter can be exposed to liquid and/or volatile organic chemicals and associated health risks. In addition, polyurethane adhesives typically also comprise small amounts of isocyanates. Both polyurethanes and isocyanates are considered to be environmentally unfriendly. Disposal of car components, such as present windscreen glazing rims/rebates, at the end of the vehicle's life can cause ecological damage.

An adhesive that could satisfy vehicle safety crush and crash standards and provide for easy, rapid, effective and damage-proof removal of a defective windscreen or other fixed glazing from a vehicle would offer immediate improvement to the industry and consumer. Additionally an adhesive that could be reused and be more environrnmentally safe than present adhesives would also be of great benefit.

In a completely different technical field it is known to provide polyesters containing air bubbles. These polyester sponges have inherent tackiness and anti-static properties and, in slab form, they have found use as anti-upset mats. In use, the mat is placed on a solid surface, for example, a desk, and the mat adheres by virtue of its tackiness to the desk surface. Office equipment or cups or other articles can be placed on top the mat. The lower surface of the article to be anchored, i.e. that in contact with the upper surface of the mat, adheres to the mat. Thus, the article remains fixed in position on the double-sided tacky mat and the fixed article is able to withstand shock, slide and earthquake motions. The mats are reusable in that they may be peeled off a surface and re-positioned/re-stuck to another surface. In the instance that the mat loses some of its tackiness, it can simply be washed with water to remove any dust and the tackiness is restored.

SUMMARY OF THE INVENTION

We have found that, by adapting the bubble size pattern, shape and overall bubble content of the polyester sponge and developing the material into a ribbon form, such a composition is surprisingly effective as a glazing adhesive. Moreover, the composition of the present invention overcomes many of the problems associated with prior art glazing adhesives.

We believe that the invention provides the first application/use of a polyester material in the automotive glazing industry.

It will be appreciated that the adhesive of the invention has application in other areas especially where two surfaces are to be bonded together and where one surface may subsequently need replacing following damage or wear, for example and without limitation, shower doors, picture framing, green houses and constructional double glazing.

DETAILED DESCRIPTION OF PREFERRED EMBODIMENTS OF THE INVENTION

Figure 1:
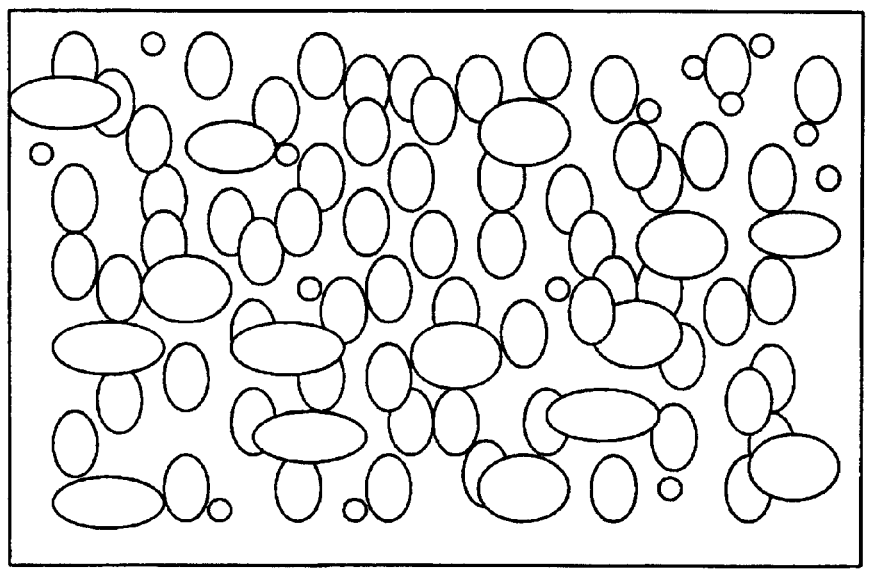
FIG. 1 illustrates the bubble distribution of the surface of an article according to embodiments of the present invention.

Reference herein to vehicle is intended to include, without limitation car, lorry, van ship, boat, plane, cable car, helicopter, hovercraft and any other form of transport in which there is fixed glazing.

In its broadest aspect the invention provides a product or composition comprising a polyester support in which there are gas pockets or bubbles. The product may be hardened or soft but by virtue of its internal and surface porosity a suction effect is produced at its interface when the product is pressure-bonded to another substrate surface.

According to a first aspect of the invention there is provided use as a glazing adhesive of a product comprising a thermoplastic polyester material having trapped gas bubbles dispersed therein, whereby the product has a surface pores to provide a suction effect.

Preferably, the thermoplastic polyester is a polyethylene terephthalate copolymer or the like.

Preferably, the gas bubbles are air bubbles.

Preferably the average diameter of the air bubble is in the region of 1 nm–50 µm.

Preferably, the air bubbles are permanently trapped within the polyester and are immobilised therein and on the surface.

Such a product can be obtained from the Sansui Corporation (Japan), Sika (South Korea) and/or BIMIX MFG Co (South Korea).

The tackiness or attaching/adhesive properties of the composition is due to air bubbles trapped within the polyester at the interface which leads to a "suction-cup" effect ie the adhesive forces originate by air suction. The absolute number and distribution pattern and volume of air bubbles within the composition determines the traction force of the composition and its tackiness properties. The upper and lower surface bubble pattern of the polyester material plays an important role in determining the tackiness or adhesive capacity. It is envisaged that depending on the intended use of the tape/ribbon within the glazing industry the bubble size, shape, pattern and number can be varied. For example, absolute bubble content can be increased if greater tackiness is desired. Conversely, bubble content can be decreased to reduce tackiness and allow for application in, for example, the picture framing industry.

The invention provides a surfaced morphological composition for use as a material adhesive in the glazing industry with the advantage that no chemical reaction is required at a bonding interface. A further advantage of the composition of the invention is that de-bonding does not leave any stick residue-on the substrate surface. The composition can be peeled away intact.

Moreover the bonding and de-bonding surface energy (or tackiness) is some order of magnitude greater than the thermo-dynamic Dupré work "W" value associated with the difference in surface energies usually involved in the adhesives predicting concept (C. Gay and L. Leiber; in Physical Review Letters, 1999, Vol 82(5), pages 936–939, "Theory of Tackiness").

It will therefore be appreciated from the foregoing that the bubble pattern within the polyester and on its surface can be altered so as to optimise such functions as: the required pressure applied to the material and a substrate surface; the elasto-viscous behaviour of the material; mechanical properties on joint deformation; surface interactions such as rugosity and waviness.

In the product of the present invention, the adhesion of the product is dependent on: the pre-load, that is to say the perpendicular and parallel adhesion forces increase with pre-loading; orientation of the surface morphology; electrostatic charge piling up at interfaces; peeling force at a perpendicular angle with a critical angle giving a surface fracture. The peeling forces of the product are ideally at least 10% of the parallel shear forces.

Preferably, the composition is in the form of a tape or ribbon, more preferably the tape or ribbon is in the range of 2–12 mm thickness, and most preferably is about 5–8 mm in thickness.

Preferably, the width of the tape or ribbon is in the range 4–30 mm, and more preferably is in the range 6–12 mm for leisure vehicles, 7–18 for heavy goods vehicles (HGVs) and 12–25 for buses. The width of the ribbon or tape is dependent on its intended use and thus may vary accordingly within the above mentioned ranges.

Preferably, the tape or ribbon can be provided wound onto a drum or the like for dispensing purposes and lengths cut therefrom.

Preferably, the composition comprises a colouring agent. Typically a pigment is added to the basic moldable material at the time of manufacture.

Preferably, the cohesion of the composition is in the range 10–20 kgf/cm$^2$.

Preferably, the stretch strength of the composition is in the range of 2–10 kgf/cm² as determined by standard JIS K6301.

Preferably, the tearing strength is composition is in the range of 2–5 kgf/cm² as determined by standard JIS K6301.

Preferably, the peeling strength of the composition is in the region 5–20 kgf/cm.

Preferably, in use and installed the composition is able to hold glass to the standard crash test criterion of national safety standards such as UAS FMVSS 212/216.

Preferably, the composition is stable within the temperature ranges of −40° C. to 220° C. and more preferably in the range of −20° C. to 120° C.

Preferably, the composition is water and U-V light resistant.

Preferably, the composition is reusable and/or recyclable.

Preferably, the composition is stable with a long shelf-life and is resistant to bacterial/fungal/microbial growth. The composition of the invention is stable with a long shelf-life and good wet characteristics.

In the instance where tackiness or attaching power is reduced the tape/ribbon can simply be washed in an appropriate solution, for example water, so as to restore the tape/ribbon tackiness.

Prior art materials, for example those manufactured by Sika (South Korea) or UAU-216 BETASEAL™ manufactured by Gurrit Essex ARG, require a curing time from 30 minutes up to 24 hours to harden. Tests of these materials show stress-strain relationships with lap shear strength in the range of 3.5 Mpa (500 psi) with a maximum at 7.0 Mpa (1,000 psi) for long curing materials. These values are referred to as high shear models. Elongation shows strain up to 500%, the tensile strength being greater than 7 Mpa (1,000 psi). A high shear model affects car body stiffness in that it improves structural body stiffness from the usual 15% up to 35–40%. The composition of the present invention has a shear elastic model of 1–10 Mpa with elongation up to 500% and tensile strength in the range of 5–10 Mpa (i.e., more than 1,000 psi). The consequence of the improved qualities of the composition of the present invention means that it is able to perform in a wider range of elastic-damping conditions and simultaneously can endow greater structural stiffness to a vehicle body. This consequently may achieve a strong improvement on the direct glazing/bonding performances and processes than the prior art and may allow a greater safety element to vehicle design.

In addition to the increased shear models, the tackiness of the composition of the invention (measured by peeling and cohesion resistant performances) showed improved values over prior art materials. The peeling force being in the order of 5–20 kgf per cm and the cohesion in the order of 10–20 kg per cm².

The composition of the invention when applied directly to glazing between glass and vehicle frames, including painted surfaces, can be termed a semi-structural adhesive which needs only a suitable adhesive pressure to stick it on to a clean surface. The composition can be removed without any breaking of glass by a shear stress (peeling out) applied on the material in the lap/rebate and advantageously without leaving any residual part of the material on surfaces for any kind of lap/rebate joint. In addition to overcoming the problems associated with removal of glazing the invention also allows for car designers to increase the stiffness of the vehicle body to obtain a suitable vibrating modulation of glazing whilst driving thus reducing the possible direct contact of glass borders/rebate/trims with material frames which often are the cause of crack formations and glazing fractures.

According to a second aspect of the invention there is provided a polyester having bubbles dispersed therein and optionally further including any of the features of the first aspect of the invention.

According to a third aspect of the invention there is provided a method of installing and/or replacing a vehicle windscreen or other fixed glazing comprising the steps of:

(i) placing a tape or ribbon comprising the composition of the first aspect of the invention around at least a part of a window aperture rim of a vehicle, (ii) positioning a piece of glazing to be installed against the tape or ribbon, (iii) applying sufficient pressure to the glazing rim to effect contact with the tape or ribbon, (iv) removing the windscreen from the main vehicle body by prising the ribbon or tape from the glazing or optionally prising the ribbon or tape from the window aperture rim.

It will be appreciated that the method of installation involves steps i–iii whilst the method of replacement involves step (iv).

Thus it will be appreciated that the tape or ribbon can be placed along the entire window aperture rim surface or it can be placed at one or more strategic points on said rim or it may be placed in double or multiple thickness or continuously stacked at one or more strategic points on or around the rim, depending on a user's requirements.

A further advantage of the method of the invention is that installation can be performed in all weather conditions.

Preferably, the method also includes the step of applying a surface and/or glass cleaner prior to the installation of the glazing. The composition of the invention performs optimally when rim or rebate supports are cleaned and dried.

A further advantage of the present invention is that the adhesive composition does not require either chemical reaction for hardening or primers at interfaces, or chemicals or structural transition of the adhesive material. The composition of the invention can be used to adhere together cleaned and dried surfaces of substrate materials such as glass metals, glass plastics, glass ceramics. There would be no requirement for expensive equipment to control the temperature of adhesives at the site of manufacture, for example pumping equipment to maintain the correct temperature of the adhesive and robotics required to hold the glass in position, would be surplus requirements to this invention.

By using the method of the invention as herein described, a vehicle windscreen or other fixed glazing can be removed and/or replaced more rapidly and with less damage to the frame and/or paint work than by prior art methods. Thus the method is more cost effective to both the fitter and customer. Moreover, the present invention allows for a reusable adhesive which is both safer to install for the fitter and also allows for more environmentally friendly disposal of vehicle component parts at the end of a vehicle's life. A yet further advantage of the composition of the invention is the potential for increasing the stiffness of the vehicle body which has implications on improvement of vehicle body safety designs.

The invention will now be described, by way of example only, with reference to FIGS. 1 and 2.

Figure 2:
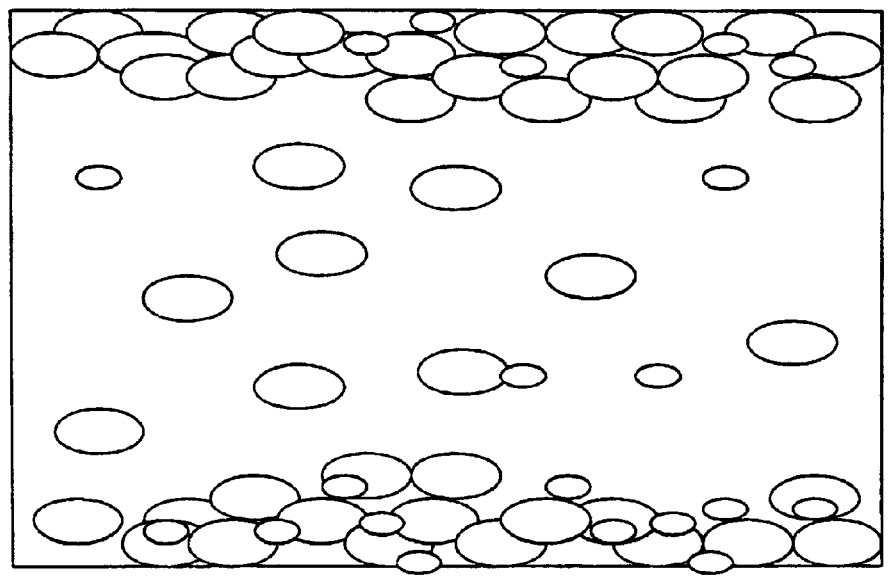
FIG. 2 illustrates a cross section of the embodiments of FIG. 1.

With reference to FIG. 1 the bubble pattern on the surface of the product can be seen. The number, pattern, distribution and size of the surface bubbles (1) determines the adhesive property of the material and can be varied to a user's requirements. The tackiness or attaching/adhesive properties of the composition is due to air bubbles trapped within the polyester at the interface which leads to a "suction-cup" effect ie the adhesive forces originate by air suction. The surface bubble pattern of the polyester material plays an important role in determining the tackiness or adhesive capacity of the product, there are more bubbles on the product surface than below the surface i.e. within the polyester material as can be seen with reference to FIG. 2. The bubble distribution or surface morphology contributes to the adhesive property of the product. In addition adhesion depends on pre-load (surface area of contact), orientation of the bubbles, electostatic charges piling up at the interface, peeling forces and shear stresses.

It will be appreciated from the figures that the bubbles are relatively randomly spaced within the polyester material but that a greater proportion of bubbles (1) reside or are trapped at the outer surfaces (2) of the product.

What is claimed is:

1. A method of installing a fixed glazing comprising the steps of:
   (i) placing a tape or ribbon comprising a thermoplastic polyester material having surface pores and having trapped gas bubbles dispersed therein so that the tape or ribbon provides a suction effect around at least a part of a window aperture rim of a vehicle,
   (ii) positioning a piece of glazing to be installed against the tape or ribbon, and
   (iii) applying sufficient pressure to the glazing rim to effect contact with the tape or ribbon.

2. A method according to claim 1, further comprising the step of cleaning at least a portion of the window aperture rim prior to placing the tape or ribbon around at least a part of the window aperture rim of the vehicle.

3. A method according to claim 1, further comprising the step of cleaning at least a portion of the glazing rim prior to positioning the piece of glazing to be installed against the tape or ribbon.

4. A method according to claim 1, further comprising the step of removing a first glazing from the window aperture rim of the vehicle prior to the step of placing a tape or ribbon around at least a part of the window aperture rim of the vehicle.

5. A method according to claim 4, wherein the step of removing a first glazing from the window aperture rim of the vehicle comprises applying a shear stress to a first tape or ribbon positioned between at least a portion of the rim of the first glazing and at least a portion of the window aperture rim of the vehicle.

6. A method of adhering a glazing within a frame comprising the steps of:
   (i) placing a tape or ribbon comprising a thermoplastic polyester material having surface pores and having trapped gas bubbles dispersed therein so that the tape or ribbon provides a suction effect around at least a part of a frame,
   (ii) positioning a piece of glazing to be installed against the tape or ribbon, and
   (iii) applying sufficient pressure to the glazing rim to effect contact with the tape or ribbon to adhere the glazing within the frame.

7. A method according to claim 6, wherein the frame is a frame of a shower door.

8. A method according to claim 6, wherein the frame is a picture frame.

9. A method according to claim 6, wherein the frame is window aperture rim of a vehicle.

10. A method according to claim 6, wherein the frame is a window aperture rim of a greenhouse.

* * * * *